United States Patent

[11] 3,612,745

[72] Inventor Robert A. Warren
Sunland, Calif.
[21] Appl. No. 53,143
[22] Filed July 8, 1970
[45] Patented Oct. 12, 1971
[73] Assignee The Sierracin Corporation
Sylmar, Calif.

[54] FLEXURAL BUS BAR ASSEMBLY
14 Claims, 4 Drawing Figs.

[52] U.S. Cl. .......... 174/68.5, 219/522, 338/323
[51] Int. Cl. .......... H05b 3/06
[50] Field of Search .......... 174/68.5; 219/522, 543; 338/308, 323

[56] References Cited

UNITED STATES PATENTS

| | | | |
|---|---|---|---|
| 2,982,934 | 5/1961 | Browne | 338/308 X |
| 3,234,629 | 2/1966 | Wheeler | 174/68.5 UX |
| 3,409,759 | 11/1968 | Boicey et al. | 219/522 |

*Primary Examiner*—Darrell L. Clay
*Attorney*—Lyon & Lyon

ABSTRACT: Described herein are bus bars and bus bar assemblies for, e.g., incorporation in electrically powerable laminated transparencies. Metal foil bus bars are flexurally configured or laterally corrugated to be longitudinally dimensionally responsive to thermal contraction and expansion of laminae adjacent the interlayer films in which the bus bars are partially immersed, when the bus bar-bearing interlayer film is incorporated in an electrically powerable laminated transparency. The bus bar-interlayer film assembly can be provided with a thin electrically conductive metallo-thermoplastic tape disposed over the bus bar and providing area contact with electrically conductive metallic coatings powered by the bus bar. The metallo-thermoplastic is rendered electrically conductive by the incorporation therein of finely divided conductive metal particles. The bus bar itself can be laterally plicate, rugulose, nodulose, or otherwise flexurally configured.

PATENTED OCT 12 1971 3,612,745

INVENTOR
ROBERT A. WARREN
BY Lyon & Lyon
ATTORNEYS

FLEXURAL BUS BAR ASSEMBLY

BACKGROUND OF THE INVENTION

Previously, electrically powerable transparencies for vehicle windows, architectural employments, and the like have been proposed wherein one of the lamina of the transparency contains an electrically conductive metallic coating on an inner surface. In order to supply electrical energy for powering this coating, it is necessary that the coating be connected in some fashion to a bus bar, the bus bar serving as a distributor of electrical energy to the conductive metallic coating. The need for careful distribution derives from the fact that the conductive metallic coating cannot withstand localized high currents without damage to or destruction of the laminate. Regions of high localized current density arise when the powered metallic coating is, by reason of its fragile nature, disrupted. To the end, inter alia, of providing area contact between bus bar and metallic coating, it has been proposed in the copending application of Warren and Lewis (U.S. Ser. No. 8470, filed Feb. 4, 1970) to dispose an electrically conductive metallo-thermoplastic tape between the bus bar and the metallic coating to be powered. By reason of the relatively flexible nature of the tape, the bus bar assembly is enabled to accommodate to some extent relative displacement between the bus bar and the metallic coating occurring when the laminate is stressed in the fabrication operation or in service. Thereby, disruptions in the metallic coating resulting from thermal expansion or contraction of the ultimate laminated transparency have been significantly reduced. However, the metallo-thermoplastic tape, without more, has not always provided laminates free from burnout occasioned by thermal expansion or contraction of adjacent laminae. It has been discovered that mismatched thermal expansion or contraction as between the bus bar and laminae influencing movement of the metallic coating continues to cause burnout problems. Indeed, it is often the case that burnout be experienced without prior visible disruption of the metallic coating. This is believed to occur because it is the nature of thin metallic films that a localized tensile stress produces a commensurate increase in localized resistivity which upon passage of electrical current becomes a localized overheat region, leading in turn to burnout failure. Thus, need has and does exist for provision of bus bar assemblies more perfectly responsive to thermal expansion and contraction of laminated transparencies in which they are incorporated.

Another problem commonly experienced by the prior art arises from the thickness of bus bar elements employed in laminated transparencies. To begin with, an unduly thick bus bar results in a "standoff" region adjacent the bus bar i.e., an opening resulting from divergence of the adjoining laminae to accommodate the bus bar. Such standoff regions create optical distortion in the ultimate laminate and are a factor tending toward delamination. The stand off problem is particularly exacerbated when the nature of the ultimate laminate dictates that the bus bar be doubled upon itself. In the usual case of a windshield, bus bars are employed along the top and bottom edges of the windshield laminate, and accordingly four leads (two for each bus bar) appear at the ends of the windshield for connection to a source of electrical energy. However, when multiphase power is to be employed, load-balancing dictates that certain of the bus bar connections be made along the top and bottom edges of the windshield rather than at the end portions thereof. For example, where three-phase power is used, the windshield is divided into three mutually electrically noncontinuous sectors, each powered by a set of bus bars. In the case of the central section, each end of the respective bus bars must make a right-angle turn toward the top or bottom edge of the windshield, as the case may be. When the bus bar is turned upon itself, in the usual case, its effective thickness is doubled and the standoff problems are similarly multiplied. Accordingly, need has existed for provision of a bus bar element which can be doubled upon itself without doubling its effective thickness.

SUMMARY OF THE INVENTION

According to this invention, there is provided a flexurally configured metal foil bus bar which is longitudinally dimensionally responsive to thermal contraction and expansion of laminae adjacent a film in which the bus bar is partially immersed when the bus bar-bearing film is incorporated in an electrically powerable laminated transparency.

One object of the invention is to provide a bus bar assembly dimensionally responsive to thermal expansion and contraction of laminae adjacent the assembly when incorporated in an electrically powerable transparency, such that burn out failure of electrically conductive metallic coatings contained in the transparency is reduced.

Another object of the invention is to provide a bus bar assembly containing a bus bar which can be doubled upon itself without doubling its effective thickness.

Yet another object of the invention is to provide a bus bar assembly containing a bus bar capable of making small radius bends in its own plane.

These and other objects and advantages of the invention will become apparent from the more detailed description which follows and from the accompanying drawing (not to scale) in which.

DETAILED DESCRIPTION OF THE INVENTION

Figures 1, 2:
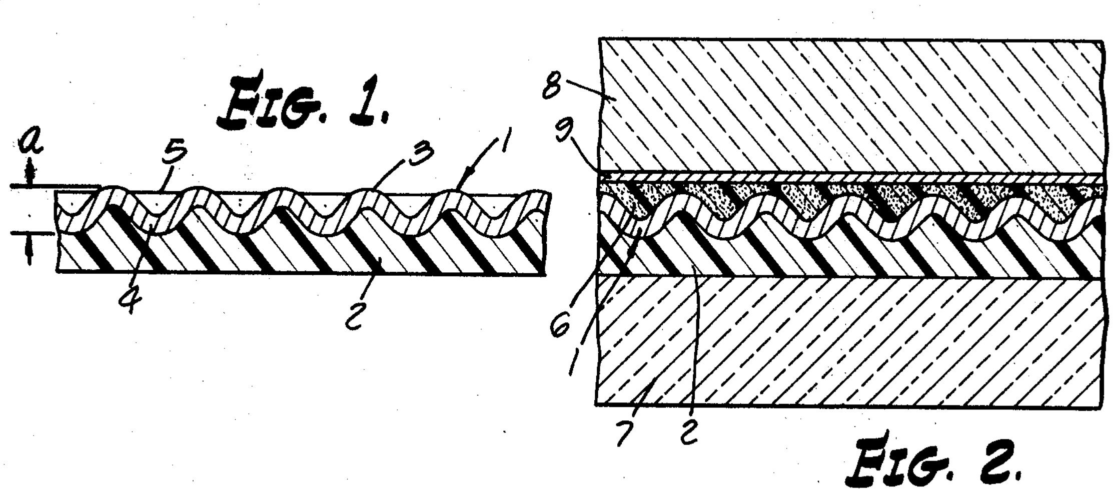
FIG. 1 is a partial, sectioned view of one embodiment of the invention.
FIG. 2 is a partial, sectioned view of a second embodiment of the invention.

Any electrically conductive metal foil can be employed as the bus bar element of this invention, once flexurally configurated. Among the suitable candidates for bus bar employment can be mentioned copper, silver, gold, tin, aluminum, magnesium, iron, zinc, and molybdenum. Of course, various alloys may be similarly used, e.g., copper-zinc, copper-manganese, copper-nickel, silver-gold, and the like. As used hereinafter, "-metal foil" encompasses both elemental metal and alloy foils. Resistivity can vary widely, but preferably is as low as possible within economic restraints. Thus, for example, resistivity of the particular metal foil employed measured in micro ohm-centimeters at 20° C., can range from about 100 (NiChrome) down to about 1.59 and lower. So measured, the resistivity of copper is approximately 1.75, while that of brass is about 7. Generally, the foil used ranges in thickness from about 0.5 to about 5 mils. In every case, appropriate thickness is chosen upon balancing the fragility and lessened conductivity of thin foils against disadvantages of thick foils—namely, increased rigidity and hence less accommodative of thermal expansion, increased profile and hence productive of standoff problems, and increased difficulty in imparting flexural configuration. It will be appreciated that the foil bus bars can be provided in any given width, depending upon their intended employment. For use in automobile windshields, the foil bus bars generally range in width from about 0.25 to about 0.75 inches.

Prior to incorporation in the interlayer film which carries it into the ultimate laminated transparency, the foil bus bar is worked in order to impart a flexural configuration or laterally corrugated dimensionally responsive to thermal expansion and contraction of laminae in the end product laminate. The plasticity of the metal foil in combination with its flexed configuration permits the bus bar to repeatedly dimensionally respond to forces of thermal expansion and contraction imposed thereon. A variety of flexural configurations can be employed, the preferred one of which is laterally plicate configuration as represented by an accordion-pleated bus bar like that shown in FIGS. 1–3 of the accompanying drawing. Such a configuration results from feeding a foil strip between vertical cut-knurling wheels having an appropriate number of teeth per inch. Alternatively, the foil can be configured in nodulose fashion by drawing between appropriately configured wheels or more conveniently, by placing a sheet of foil against sandpaper and drawing a vacuum from the opposite side of the sandpaper. Other flexural configurations will occur to the art-skilled in the light of this disclosure, e.g., uniformly nodulose configurations such as "pistol-grip" forms, rugulose or finely wrinkled configurations, etc. While a diverse variety of particular configurations can be employed, it must be remembered that more than mere surface texturing is involved—the working must affect the foil throughout so that the resulting bus bar be truly flexed in cross section and hence dimensionally responsive to longitudinal forces imposed thereon. Preferably, the flexurally configured or "peak-to-peak" thickness of the material ("*a*" in FIG. 1) is approximately three times the intrinsic thickness of the foil. "Intrinsic thickness" has reference to the thickness of the foil before working to a flexural configuration, i.e., that thickness in which the foil is conventionally commercially obtained.

With reference now to FIG. 1, there is depicted a flexurally configured bus bar 1 partially immersed in an interlayer film 2 of the sort commonly used between rigid plies in safety glass-type constructions. The bus bar is partially immersed in the sense that, while its exterior surface 3 is essentially entirely freed of overlapping interlayer material, at least protuberant portions 4 of its interior surface are below plane 5 of interlayer film adjoining the bus bar. Indeed, in the preferred embodiment, even the protuberant portions of the exterior surface of the bus bar are below that plane. By reason of the partial immersion of the bus bar in the interlayer film, finished products consisting of flexurally configured bus bars disposed between the interlayer film and a metallo-thermoplastic tape can be provided which exceed the original thickness of the interlayer film by no more than about a mil, notwithstanding that the intrinsic thickness of the foil used is 1 mil, and the effective thickness of the bus bar in its flexural configuration is approximately 3 mils.

FIG. 2 depicts a bus bar assembly like that of FIG. 1 to which has been added an electrically conductive metallo-thermoplastic tape 6, the taped bus bar being disposed between the laminated to two rigid, transparent glasslike plies 7 and 8, one of which bears an electrically conductive metallic coating 9 electrically contacting the tape 6. The plies 7 and 8 are formed from glass or plastic material such as, in the case of glass, soda glass; and in the case of plastic, polycarbonate plies, or plies of polymethylmethacrylate (as cast or biaxially stretched). The term "glasslike" as used herein refers to all such high-modulus glass or plastic materials. The electrically conductive metallic coating 9 can be of, e.g., gold, silver, or copper which has been vacuum deposited, as by vacuum evaporation or sputtering in conventional fashion. The metallic coating 9 is transparent, and preferably is provided in thicknesses sufficient to exhibit a specific resistivity on the order of from about 2 to 100 ohms per square. "Transparent" refers to that property of a material or structure which admits of the transmission of visible light without appreciable scattering such that objects beyond are clearly visible. Preferably, in the laminated transparencies in which the bus bar assemblies of this invention are employed, materials are chosen such that the laminated transparency transmits at least 70 percent of incident light. Of course, in architectural and other employments where light transmission is not critical, transmission can be as low as, e.g., 5 percent. The "laminated transparencies" referred to above and throughout are those which incorporate one or more rigid, transparent dielectric glasslike plies.

Metallo-thermoplastic tapes suitable for practice with this invention are disclosed in the copending application of Warren and Lewis (U.S. Ser. No. 8470, filed Feb. 4, 1970), the disclosure of which is incorporated herein by reference. Briefly, such tapes are produced by the dispersion of finely divided, electrically conductive metal particles in a resilient, thermoplastic base. The particular thermoplastic material employed in chosen for its ability to be joined to adjacent structural material by the application of light pressure and heating to a temperature within the range of about 160° F. to 300° F. when loaded with a proportion of electrically conductive, finely divided metallic particles sufficient to impart a volume resistivity in the range of $9\times10^{15}$ ohm-cm. to $4\times10^{11}$ ohm-cm., preferably $1.8\times10^{15}$ ohm-cm. to $2.7\times10^{13}$ ohm-cm., and most preferably $1.8\times10^{14}$ ohm-cm. to $2.7\times10^{14}$ ohm-cm. The temperature range referred to generally defines the outer limits of a particular thermoplastic's suitability in the employments contemplated. Thus, most laminated transparencies produced according to the invention will experience service at less than about 160° F. Accordingly, thermoplastics employed in the tape preferably exhibit melting points or ranges, or softening points or ranges greater than about 160° F., so as to maintain the integrity of the bus bar attachment in service. At the same time, it is necessary that the thermoplastics be heat joinable to surrounding materials or a structure at temperatures less than about 300° F., since other considerations having to do with dimensional integrity and physical stability of the interlayer films militate against the use of temperatures in excess of that temperature in securing the bus bar thereto. Preferably, the thermoplastics employed have melting points or ranges, or softening points or ranges, between about 180° F. and 275° F., most preferably between about 180° F. and 220° F. The metallo-thermoplastic tape preferably ranges in thickness from about 2 to about 5 mils, and most preferably is about 5 mils thick.

The metallo-thermoplastic tape generally adherably joins the bus bar to the metallic coating to be joined. With reference to FIG. 2, it will be appreciated that the ability of the bus bar 1 to flexurally respond to thermal contraction and expansion of adjacent plies 7 and/or 8 substantially prevents imposition of shear forces at one or more of the interfaces rigid ply-metallic coating, metallic coating-tape, and tape-bus bar. The electrical discontinuities and potential burnout sites engendered by such shearing forces are hence substantially reduced in number.

Generally, the tape is at least as great in width as the bus bar itself, so that the bus bar can be entirely masked from the electrically conductive coating powered thereby. Most current passes between coating and bus bar near that edge of the bus bar closest to a second bus bar with which the first is ultimately connected in series (the "inboard" edges depicted as *b* and *b'* on the automobile windshield which is the subject of FIG. 4). Commonly, then, the tape need be disposed only between the conductive coating and a moderate portion of the bus bar width nearest the "inboard" edge thereof, e.g., as little as one-fourth the width of the bus bar is masked from the coating by the tape.

The bus bar-bearing interlayer films can be employed in configuration other than depicted in FIG. 1. For example, a plastic carrier film bearing a vacuum-deposited coating can be laminated to an interlayer bearing a bus bar disposed between metallo-thermoplastic tape and the interlayer, so that the vacuum-deposited coating electrically contacts the tape. The term carrier film as used herein refers to a plastic material capable of enduring the vacuum metal deposition process and hence having a heat distortion temperature greater than about 120° F., preferably greater than about 150° F.; permitting of the deposition of satisfactory electrically conductive coatings and hence relatively free of plasticizers; and sufficiently dimensionally stable to avoid destruction of the electrical integrity of the coating borne by it during temperature cycling experienced in the lamination and during service powering. While precise quantification is difficult when the wide variety of suitable interlayer and carrier materials is considered, it can generally be said that typical carrier materials will have an ultimate elongation of less than about 150 percent and tensile strengths greater than about 500 p.s.i. each parameter being defined according to ASTM D 412–68. Those specifications are not in every case necessary, as witness the suitability of fluorinated ethylene-propylene copolymers having elongation of 300 percent and tensile strength between about 2,500 and 3,000 p.s.i., and of polytetrafluoroethylene, having elongation of between about 100 and 350 percent and tensile strength between about 1,500 and 4,000 p.s.i. The liberal interpretation intended of this general specification of elongation and tensile strength will be apparent from the following table, wherein there are listed suitable materials for carrier employment, together with ultimate elongations and tensile strengths in which they are presently available. Herein, flexible laminar structures embodying an interlayer film in combination with such carrier films and a carried conductive coating are referred to as "sublaminates" because they are intended for or are suitable for subsequent incorporation between two rigid plies of some ultimate laminate.

TABLE

| Carrier | Elongation (%) | Tensile Strength (p.s.i.) |
|---|---|---|
| cellulose acetate | 15–70 | 8,000–16,400 |
| cellulose triacetate | 10–40 | 9,000–16,000 |
| cellulose acetate butyrate | 50–100 | 5,000–9,000 |
| cellulose propionate | 60–80 | 4,000–5,000 |
| ethyl cellulose | 20–30 | 8,000–10,000 |
| polymethyl methacrylate (extruded, biaxially stretched) | 4–12 | 8,200–8,800 |
| polytrifluorochloroethylene copolymer | 50–150 | 5,000–10,000 |
| polyvinylfluoride | 115–250 | 7,000–18,000 |
| polycarbonate | 85–105 | 8,400–8,800 |
| polypropylene (biaxially oriented) | 50–200 | 12,000–33,000 |
| polymethyl methacrylate (Type A extruded) | 75 | 5,100 |
| polymethyl methacrylate (Type B extruded) | 12 | 7,800 |
| polyethylene terephthalate polyester | 60–165 | 20,000–35,000 |
| vinylidene chloride vinyl chloride copolymer | 35–110 | 8,000–20,000 |
| polyvinyl chloride (solvent cast, nonplasticized) | 3–100 | 6,000–9,000 |
| vinylchloride acetate copolymer (nonplasticized) | 3–100 | 5,500–8,000 |
| regenerated cellulose | 10–50 | 7,000–18,000 |

The term "interlayer film" as used herein refers to a film having rheological properties which permit optional texturing of its outer surface for deaeration during subsequent heat and pressure lamination, the textured substance becoming smooth during such lamination such that the resulting laminate is transparent; the material having bond strength to the rigid glass and plastic plies of the invention adequate to the purposes thereof. Typical candidates for interlayer employment include polyurethane, polyvinyl butyral, polyvinyl acetal, and polyvinyl chloride films, commonly ranging in thickness from about 0.015 to 0.030 inches. The interlayer materials are generally, but in particular instances need not be, plasticized with, e.g., plasticizers such as dioctyl phthalate, tricresol phosphate, dibutyl phthalate, dibutyl sebacate (DBS), triethylene glycol di-(2-ethyl-butyrate) commonly known as 3GH, as well as other conventional, e.g., alkyl phthalate or alkyl ester plasticizers, Plasticizing compounds are chosen according, primarily, to two criteria—mutual solubility or miscibility with the material plasticized (i.e., compatibility) and a boiling point sufficiently high as to prevent outgassing at temperatures experienced in manufacture and operation of the ultimate laminate. They are conventionally employed in proportions ranging from about 5 percent to 65 percent by weight of the plasticized material. Naturally, elongation and tensile strength of the interlayer material are influenced by the amount of plasticizer employed. Elongation capability of the interlayer film, of course, influences the so-called "head catch" capability thereof in employments such as interlayers in vehicle windshields. In the most general sense, interlayers employed in this invention have an ultimate elongation greater than about 150 percent and tensile strength less than about 6,500 p.s.i., preferably less than about 5,000 p.s.i. For example, polyvinyl butyral plasticized with 21 percent by weight of 3GH exhibits a tensile strength of 4,750 p.s.i. and ultimate elongation of 200 percent; with 37.5 percent by weight DBS, tensile strength is 3,050 p.s.i. and ultimate elongation 250 percent. Polyurethanes employed have displayed tensile strengths ranging from 4,500 to 6,500 p.s.i. and ultimate elongation ranging from 400 percent to 480 percent. Plasticized polyvinyl chloride ranges in tensile strength from about 1,400 to 5,600 p.s.i. and in ultimate elongation from 150 percent to 500 percent.

The flexurally configured metallic bus bar can be applied to the interlayer film with subsequent application of the metallo-thermoplastic tape. Preferably, however, bus bar and tape are simultaneously applied, as by laying up the bus bar between interlayer film and tape, followed by application of a hot iron or the like at discrete intervals along the tape or, most preferably, continuously along the length of the tape. The metallo-thermoplastic tape flows under these conditions into the concavities of the flexurally configured bus bar which bus bar is in turn partially immersed in the vinyl interlayer. Accordingly, the resulting bus bar assembly enjoys area contact means as well as low profile. As used herein, "profile" refers to the elevation of the bus bar or bus bar-tape combination, as the case may be, above the plane of adjoining regions of interlayer. While application in the manner just-stated is satisfactory for most purposes, it has been found more convenient to simply power the foil bus far, as with from about 100 to 200 amperes, whereupon sufficient heat is provided to permit immersion of the bus bar in the interlayer film and flow the metallo-thermoplastic tape material into the bus bar concavities. During powering of the bus bar for incorporation purposes, pressure is gently applied, as with a roller, to aid in immersion of the bus bar. Flow of interlayer material across the outer surface of the bus bar (in the extreme case, "total" immersion of the bus bar) can be conveniently prevented simply by employing a roller greater in width than the bus bar-tape combination. Thereby, regions of the interlayer which adjoin the bus bar act as a stop to the roller, preventing undue immersion of the bus bar. As delivered, interlayer material is conventionally textured to aid in deaeration during production of the ultimate laminated transparency. Because the roller used in bus bar incorporation is preferably somewhat wider than the tape-bus bar combination, it will often be the case that regions adjacent the bus bar, such as those indicated at 10 in FIG. 3, will become detextured. In this event, the bus bar-bearing interlayer film is preferably again subjected to texturing, as with an appropriately embossed roller, to prevent the formation of air bubbles during subsequent lamination steps. Retexturing of the interlayer film, by reason of the greater plasticity of the interlayer film as compared to the metal bus bar, has no significant effect upon the previously imparted flexural configuration of the bus bar itself.

Figure 3:
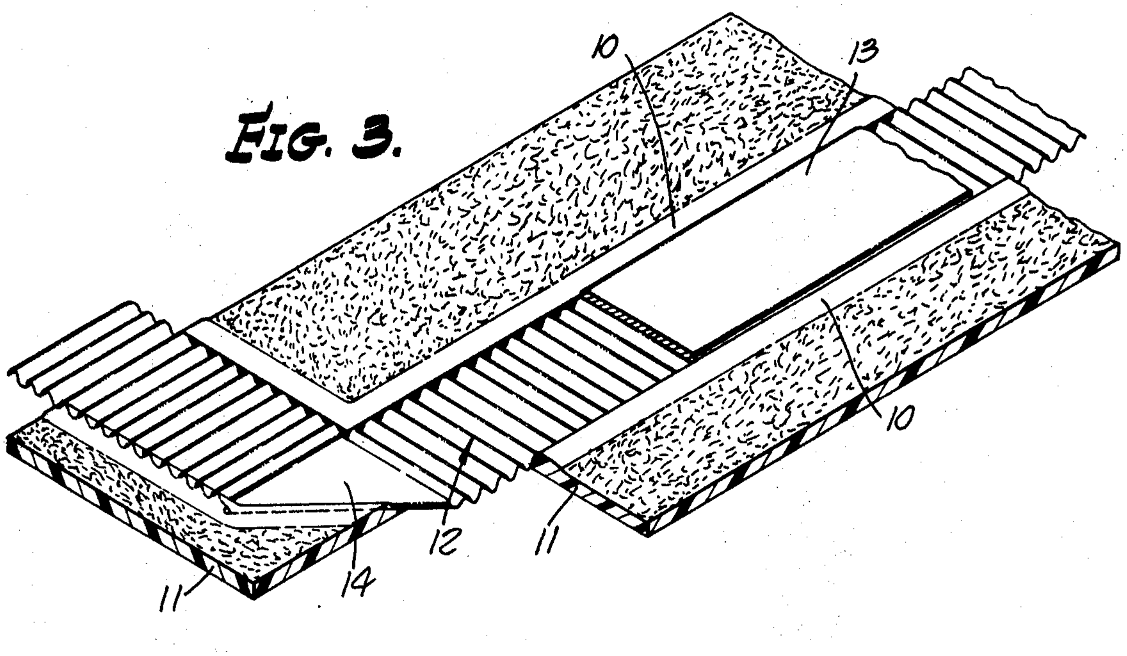
FIG. 3 is a partial pictorial view of an embodiment of the invention, partially sectioned.

FIG. 3, more specifically, depicts an interlayer film 11 on which has been disposed a flexurally configured bus bar 12 provided with metallo-thermoplastic tape area contact 13 (a portion of the tape has been sectioned to display the flexurally configured bus bar itself). One important advantage of the invention is apparent from FIG. 3, which illustrates the case where connection to the bus bar must be had from an edge of the interlayer parallel to the direction in which the bus bar travels throughout most of its length. In order to achieve that connection, the bus bar must be doubled upon itself, as illustrated generally at 14. In the normal case, such as where a braided bus bar is employed, doubling the bus bar upon itself in the manner shown would approximately double its effective thickness, engendering serious problems of standoff in the ultimate laminated transparency. In the case of this invention, however, no such difficulty arises because of the flexural configuration of the instant bus bar. Once the bus bar is doubled upon itself, the lateral plications or other flexural characteristics can be eliminated, as by crimping the doubled portion of the bus bar with a pliers or other such handtool. Consequently, if the bus bar exhibits an intrinsic thickness of 1 mil and upon flexural configuration, an effective thickness of 3 mils, then upon doubling the doubled portion which normally would be approximately 6 mils in thickness can be crimped so as to exhibit no greater thickness than twice the intrinsic thickness of the material. When it is recognized that standard braid currently used in the construction of heated aircraft windshields is 25 mils thick before doubling, the advantage of a bus bar substantially thinner than currently available braided bus bars is added the desirable property of doubling to achieve a total thickness less than the effective thickness of the bus bar when used as a single ply.

Figure 4:
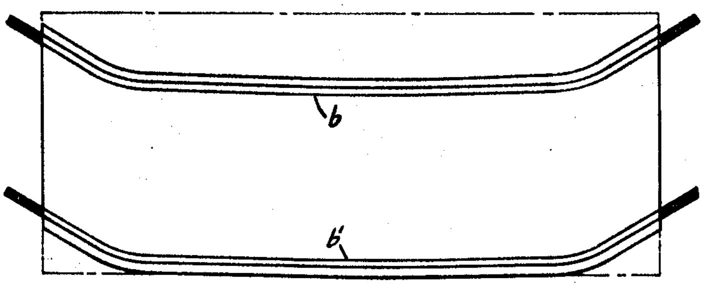
FIG. 4 is a pictorial view illustrating one advantage of the invention, as will be more fully described hereinafter.

A further advantage of the invention appears from FIG. 4, which pictorially depicts the result of projecting a bus bar-equipped conventionally singly curved windshield onto a flat plane. The lands exteriorly bounded by phantom lines represent portions of the windshield blank cut away in the course of sag-forming the curved windshield. Form the projection, it will be apparent that the bus bar is required to bend in its own plane when incorporated between sag-formed doublets to form a curved safety glass-type automobile windshield. By reason of their flexural configuration, the bus bars of this invention can be caused to form small radius bends in their own plane without tearing. In the case of the laterally plicate bus bar, the lateral pleats along the outer portion of the curving bus bar simply open out to accommodate the radius bend. Pursuant to the invention, bus bars have been provided capable of forming bends in their own plane of inside radius less than about 10 inches, and commonly bus bars capable of bending in their own plane about one-half inch inside radius have been produced. Most preferred are laterally plicate bus bars capable of bending in their own plane about an inside radius less than or about 4 inches.

The flexurally configured bus bars of the invention can be used to power electrically conductive coatings in addition to those contained between rigid plies in safety glass-type constructions. Thus, for example, a single rigid member of glass, plastic, or other material bearing a conductive coating on the surface thereof can be powered by bus bars according to this invention. Preferably in such case a conductive metallo-thermoplastic tape is disposed between the bus bar and tape, and the exposed conductive surfaces of the article insulated exteriorly in conventional fashion, as with a suitable insulative coating. Thus, the bus bars of the invention can be used to power printed circuit boards and the like, as well as safety glass-type constructions.

The following example, in which all parts and percentages are by weight unless otherwise indicated, is presented as illustrative of the invention. The flexurally configured bus bar is produced from two mil copper foil cut into a 5/16 inch wide strip and fed between two 80 teeth per inch vertical cut knurling wheels. The formed bus bar displays an electrical resistance of 0.75 micro-ohms per inch of length, and is capable of carrying 15 amperes with a power consumption of only 0.6 watts per inch square. The thickness of the 2-mil foil after the knurling operation is approximately 5 mils and its flexibility is such that is can make a ½ inch inside radius bend in its own plane. The metallo-thermoplastic tape is produced in the following fashion. A polyamide resin (Versalon 1140, available from General Mills) is placed in isopropyl alcohol to form a 20 percent solution of polyamide resin. Approximately three hours is required for the polyamide to go into solution, with intermittent agitation at a temperature of about 180° F. A silver paste is then formed by mixing one part of the 20 percent polyamide solution with one part silver flake passing a 200 mesh screen. The resulting paste is doctor-bladed over a Teflon film to a thickness of about 16 mils and allowed to air dry overnight. The applied paste thickness of 16 mils decreases to a final thickness of 3.5 mils upon completion of solvent evaporation. At this thickness, the volume resistivity of the solvent-free tape ranges from about $1.8\times10^{14}$ ohm-cm. to $2.7\times10^{14}$ ohm-cm. The solvent-freed paste is then stripped from the Teflon film and cut into three-eighths inch widths. The flexurally configured bus bar is disposed between the tape and an interlayer film (polyvinyl butyral) 0.030 inches in thickness. Electrical connection is made to the free ends of the bus bar and 100 amperes of current passed through the bus bar. Simultaneously, light pressure is applied along the length of the tape-covered bus bar, whereupon the heated metallo-thermoplastic tape flows into the concavities of the flexurally configured bus bar, which bus bar in turn is partially immersed in the interlayer film. The following layup is then formed: a first ply of biaxially stretched polymethylmethacrylate; a sheet of polyvinylbutyral interlayer; a carrier film of polyethylene terephthalate polyester bearing a vacuum deposited coating of gold; the polyvinylbutyral interlayer bearing the attached bus bar assembly with the electrically conductive tape contacting the conductive gold coating; and a second ply of biaxially stretched polymethylmethacrylate. Laminating at about 200° F. and about 200 p.s.i. produces a laminated transparency exhibiting excellent electrical continuity between the bus bar and the conductive coating. Upon sustained powering, the laminated transparency resists electrical burnout.

Solvent-dispersible thermoplastics other than the above polyamide resin can be employed in producing the metallo-thermoplastic tape, e.g., polyisobutylene, butadiene, and acrylonitrile-butadiene rubbers, polychloroprene, and the like. Similarly, with respect to other elements of the invention or elements with which the invention can be employed, a diverse variety of materials can be substituted for those specifically described hereinabove, as will be apparent to those skilled in the laminated transparency art.

From the foregoing, it will be apparent that there is provided by this invention a bus bar capable of making small radius bends in its own plane, capable of flexurally responding to thermal contraction and expansion of adjacent laminae when incorporated in a laminated transparency, configured in such fashion as to admit of doubling without doubling the effective thickness thereof, and capable of accommodating its entire thickness within the relatively thin interlayer materials conventionally employed in the construction of safety glass-type laminated transparencies. These and other advantages are obtained in straightforward, economic fashion without resort to unduly expensive components, and provide bus bar assemblies and sublaminates which can be incorporated between glasslike plies without requiring any steps on the part of, e.g., a windshield manufacturer in excess of those he conventionally undertakes in the manufacture of safety glass.

Having fully described the invention, it is intended that it be limited only by the lawful scope of the claims appended hereto.

I claim:

1. An article comprising an interlayer film transparent when its exterior faces are smooth and bearing on at least one of said faces an elongate electrically conductive metal bus bar partially immersed in said film, said bus bar being a laterally corrugated metal foil bus bar longitudinally dimensionally responsive to thermal contraction and expansion of laminae adjacent said film when said article is incorporated in an electrically powerable laminated transparency.

2. The article of claim 1 wherein the corrugations of said bus bar are plicate.

3. The article of claim 2 wherein said bus bar exhibits peak-to-peak thickness approximately three times the intrinsic thickness of said foil.

4. The article of claim 1 wherein said bus bar is adherably disposed between said film and an electrically conductive metallo-thermoplastic tape.

5. The article of claim 4 wherein said tape exhibits volume resistivity within the range from about $1.8\times10^{14}$ to $2.7\times10^{14}$ ohm-cm.

6. An article according to claim 4 adherably disposed between two rigid transparent dielectric glasslike plies to form a laminated transparency, one surface of one of the said plies bearing on electrically conductive metallic film electrically contacting said tape.

7. In an integral sublaminate structure transparent when its exterior faces are smooth and comprising a carrier film bearing an electrically conductive metallic coating disposed between the said carrier film and an interlayer film, said interlayer film bearing on the face thereof adjoining said metallic coating a metal bus bar disposed between the said face and a flexible, electrically conductive metallo-thermoplastic tape electrically contacting said bus bar, the improvement wherein said bus bar is a laterally corrugated metal foil bus bar partially immersed in said interlayer film and longitudinally dimensionally responsive to thermal contraction and expansion of laminae adjacent said interlayer film when said sublaminate is incorporated in an electrically powerable laminated transparency.

8. The sublaminate of claim 7 wherein the corrugations of said bus bar are plicate.

9. The sublaminate of claim 7 which additionally comprises a second interlayer film adhered to the face of said carrier film opposite the face bearing the said metallic coating.

10. The sublaminate of claim 7 disposed between two rigid transparent glasslike plies to form an electrically powerable laminated transparency.

11. The sublaminate of claim 7 wherein said tape exhibits volume resistivity within the range from about $1.8\times10^{14}$ to $2.7\times10^{14}$ ohm-cm.

12. An electrically powerable article comprising a rigid member bearing on one surface thereof an electrically conductive metallic coating, said coating bearing on the surface thereof in electrical contact therewith an elongate electrically conductive laterally corrugated metal foil bus bar longitudinally dimensionally responsive to thermal contraction and expansion of said member.

13. An article according to claim 12 wherein there is adherably disposed between said metallic coating and said bus bar an electrically conductive metallo-thermoplastic tape.

14. The article of claim 13 wherein the corrugations of said bus bar are plicate.

UNITED STATES PATENT OFFICE
CERTIFICATE OF CORRECTION

Patent No. 3,612,745 Dated October 12, 1971

Inventor(s) ROBERT A. WARREN

It is certified that error appears in the above-identified patent and that said Letters Patent are hereby corrected as shown below:

In the Specification, at column 3, line 43, "the" should read--and--. Column 4, line 6, "$9X10^{15}$" should read--"$9X10^{-5}$--and "$4X10^{11}$" should read--"$4X10^{-1}$"--. Column 4, line 7, "$1.8X10^{15}$" should read--"$1.8X10^{-5}$"--and "$2.7X10^{13}$" should read--"$2.7X10^{-3}$". Column 4, line 8, "$1.8X10^{14}$" should read--"$1.8X10^{-4}$"--and "$2.7X10^{14}$" should read--"$2.7X10^{-4}$"--.

In the Claims, at claim 5, line 2, "$1.8X10^{14}$" should read--"$1.8X10^{-4}$"--and "$2.7X10^{14}$" should read--"$2.7X10^{-4}$"--. Claim 11, line 2, "$1.8X10^{14}$" should read--"$1.8X10^{-4}$"--.

Claim 11, line 3, "$2.7X10^{14}$" should read--"$2.7X10^{-4}$"--.

Signed and sealed this 2nd day of May 1972.

(SEAL)
Attest:

EDWARD M.FLETCHER,JR.
Attesting Officer

ROBERT GOTTSCHALK
Commissioner of Patents